April 4, 1950     J. W. HEBERT     2,502,787
ELECTRIC BURNER

Filed Aug. 30, 1946     2 Sheets-Sheet 1

INVENTOR.
John W. Hebert.
BY Frank C. Fearman
ATTORNEY

April 4, 1950 J. W. HEBERT 2,502,787
ELECTRIC BURNER
Filed Aug. 30, 1946 2 Sheets-Sheet 2
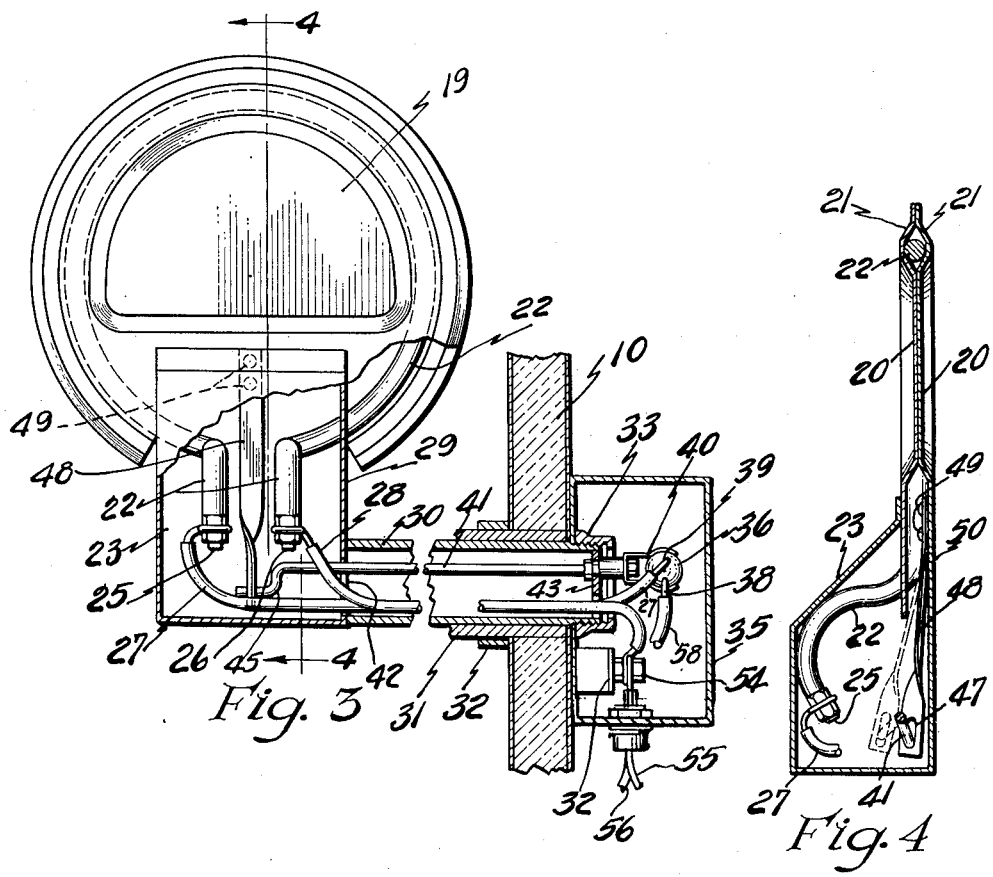
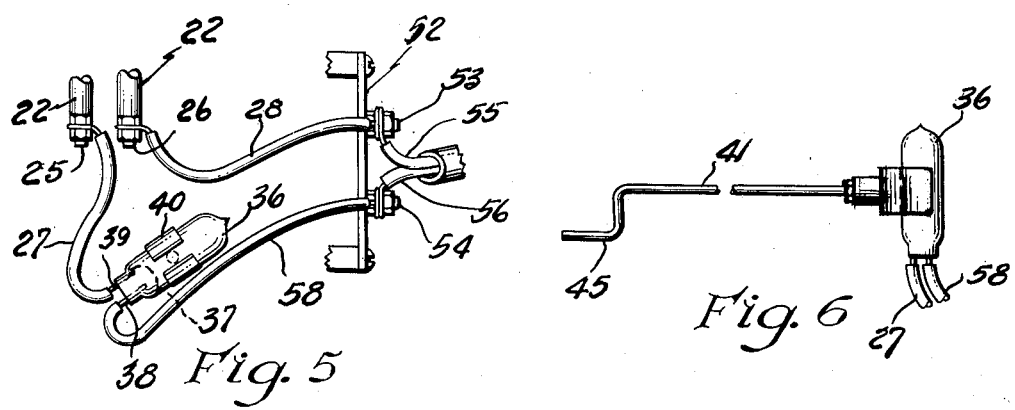
INVENTOR.
John W. Hebert.
BY Frank C. Karman.
ATTORNEY

UNITED STATES PATENT OFFICE 2,502,787

ELECTRIC BURNER

John W. Hebert, Bay City, Mich., assignor to Valley Welding & Boiler Co., Bay City, Mich.

Application August 30, 1946, Serial No. 694,058

3 Claims. (Cl. 219—35)

The invention relates to improvements in electric heaters such as are used for incinerators in homes, offices or other locations for burning smaller amounts of garbage, rubbish and other combustible matter.

The object of the invention is an electric heater which is automatically disconnected from the electric current supply lines when a predetermined temperature has been produced in the combustion chamber of the incinerator, either by the self-sustained combustion of the garbage or other material therein or when the heater itself, due to lack of combustible matter, attains an undesired high temperature.

Another object of the invention is the employment of a heat responsive or bi-metallic element in the heater which upon reaching a predetermined high temperature opens an electric switch in an electric circuit which supplies the electric current to the heater and thereby shuts off any further electric current from the heater until the bi-metallic control element has cooled off and has closed the switch again.

Other objects of the invention will be apparent or will be specifically pointed out in the description forming a part of this specification, but it is to be understood that the invention is not limited to the embodiment herein described, as various forms may be adopted within the scope of the claims.

The invention will be better understood from the following description taken in connection with the accompanying drawings which disclose by way of example one preferred embodiment of the invention and in which:

Fig. 3 is an enlarged side elevation view partly in section of the electric heater assembly and shows the attachment of the heater to the shell of the incinerator.

Fig. 4 is a sectional view of the heater substantially along the line 4—4 in Fig. 3 looking in the direction of the arrow.

Fig. 5 is a detailed view of the mercury switch in its normal closed position, and Fig. 6 is a detailed view showing the mercury switch mounted on its supporting crank shaft which is actuated by a heat responsive element.

Figure 1:
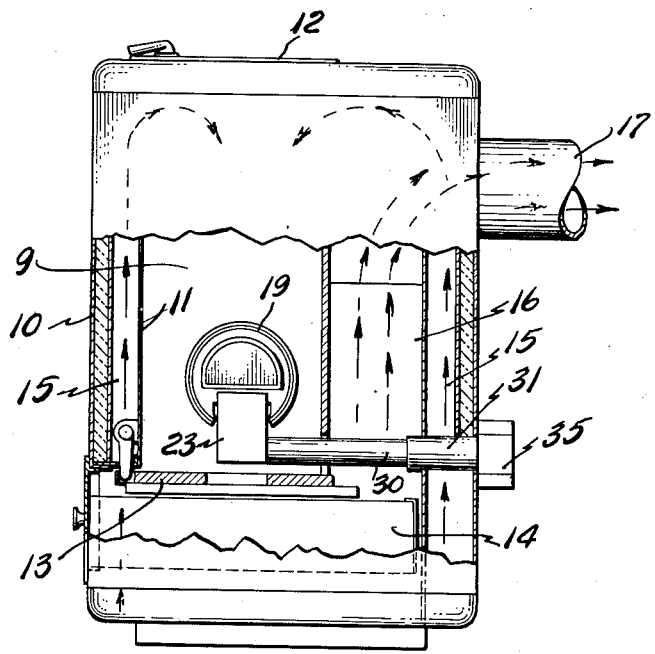
Fig. 1 is a side elevation view partly in vertical section of an incinerator equipped with an electric heater.

Referring to the drawings, the Fig. 1 illustrates a downdraft incinerator comprising an outer heat insulating shell 10, an inner shell 11 spaced from the outer shell and forming the combustion chamber 9 for the garbage, a grate 13 separating the combustion chamber 9 from the ash receiving compartment 14, and a cover 12 for the top of the combustion chamber. The space between the outer shell 10 and the inner shell 11 is used for the establishment of an air flue 15, which admits the air for assisting the combustion at the lower end of the incinerator to flow upwardly therein and then downwardly in the combustion chamber 9 through the grate 13 and then upwardly in another flue section 16 whose upper end leads to the discharge flue 17.

The electric heater 19 is formed of two circular shield plates 20, each having adjacent their circumference a circular groove 21 formed therein for retaining a heating element 22 when the plates 20 are welded or otherwise secured together. The lower portion of the two circular plates 20 have attached thereto a housing 23 into which extend the two terminals 25, 26 of the heating element 22 to be connected with flexible electric conductors 27 and 28 respectively. One end wall 29 of the housing 23 has attached thereto a tube 30 which supports the housing 23 and the heater 19 thereon in its desired operative position within the combustion chamber 9 and for this purpose extends through the walls of the inner and outer shells 11 and 10 and is fixedly secured to the outer shell 10 in any desired manner, for example as shown by a sleeve 31 carrying a stop collar 32 and a threaded cap 33 on the outer end of the tube 30. The cap 33 draws the collar 32 against the inner wall face of the shell 10.

A switch box 35 is attached to the outside of the outer shell 10, preferably as shown, by the same threaded cap 33 which secures the pipe 30 to this wall. An electric switch in the form of a sealed glass bulb 36 containing a small quantity of mercury 37 and having two contact electrodes 38, 39 at one end is held by a bracket 40 secured to one end of a shaft 41 which projects into the switch box 35 and extends through the tube 30 and into the housing 23. The shaft 41 is rotatably supported in a bearing plate 43 secured in the outer end of the tube 30 and in a bearing aperture 42 provided in the wall 29 of the housing 23. A crank 45 at the inner end of the shaft 41 extends into a slot 47 at one end of a bi-metallic element 48, the other end of which is fixedly attached at 49 to the inner face of the rear wall 50 of the housing 23.

A terminal strip 52 within the switch box 35 carries two terminal posts 53 and 54 to which the two current supply lines 55 and 56 respectively are attached. The terminal post 53 has also attached thereto the conductor 28 leading to the terminal 26 of the heating element 22, while the other terminal post 54 is connected by a flexible conductor 58 with one electrode contact of the mercury bulb 36, the other electrode contact of which is connected to the flexible conductor 27 leading to the other terminal 25 of the heating element 22. The current supply lines 55 and 56 are adapted to be connected over a master switch (not shown) to any suitable source of electric power.

Figure 2:
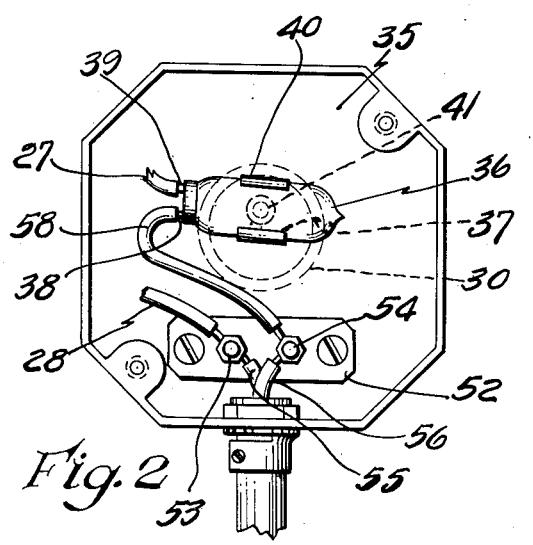
Fig. 2 is an enlarged elevational view of the switch box containing the electric switch for the heater with the top wall of the switch box removed.

In the inoperative condition of the incinerator, i. e. when the heating element 22 is cold, the bi-metallic element 48 is in the position shown in full lines in Fig. 4. In this position the mercury bulb 36 is tilted angularly as shown in Fig. 5 and it will be noted that the contact electrodes 38, 39 are conductively connected with each other by the mercury globule 37. Upon the deposition of the garbage, rubbish or the like into the combustion chamber 11 and closing the master switch (not shown) the electric current will flow into the heater circuit and heat the heating element 22 to such a degree of temperature that the garbage surrounding the heater 19 will be ignited and starts to burn. If the garbage is sufficiently dry and contains a sufficient amount of combustible matter the temperature will be raised to such a degree that the bi-metallic element 48 in the housing 23 will be influenced and will be moved into the position shown in the dotted lines in Fig. 4. This movement of the bi-metallic element 48 causes a rotation of the shaft 41 and a tilting of the glass bulb 36 into the position shown in Fig. 2. This results in an opening of the heater circuit, because the mercury globule 37 in the bulb 36 comes out of engagement with at least one of the contact electrodes 38, 39. The combustible matter in the combustion chamber, 19, however, will continue to burn until completely consumed or until the temperature drops to such a low degree that the bi-metallic element 48 is again returned to its initial position in which the mercury switch is again closed. An opening of the mercury switch takes place also when no combustible matter is present in the combustion chamber and the master switch should be closed, because the heating element will assume such a high temperature that the bi-metallic element 48 opens the mercury switch.

What I claim as my invention is:

1. In an automatically controlled incinerator, a casing, a combustion chamber within said casing, a tubular support extending through said casing and projecting into said combustion chamber, a housing on one end of said tubular support, an electric heating element mounted on said housing and located centrally of said combustion chamber, an electric switch on the other end of said support in circuit with said heating element and a source of electrical energy, a heat responsive element located within said combustion chamber and arranged to be independently influenced by the heating element and heat generated within said combustion chamber by the burning refuse therein and a control shaft extending through said tubular support with one end connected to said heat responsive element and the other end operatively connected to said electric switch.

2. In an automatically controlled incinerator, a casing, a combustion chamber within said casing, a tubular support extending through said casing and projecting into said combustion chamber, a housing on one end of said tubular support, an electric heating element mounted on said housing and located centrally of said combustion chamber, an electric switch on the other end of said support in circuit with said heating element and a source of electrical energy, a heat responsive element located within said combustion chamber and arranged to be independently influenced by the heating element and heat generated within said combustion chamber by the burning refuse therein and a control shaft extending through said tubular support with one end connected to said heat responsive element and the other end operatively connected to said electric switch, said electric heating element being of circular shape and arranged vertically out of the path of refuse.

3. In an automatically controlled incinerator, a casing, a combustion chamber within said casing, a tubular support extending through said casing and projecting into said combustion chamber, a housing on one end of said tubular support, an electric heating element mounted on said housing and located centrally of said combustion chamber, an electric switch on the other end of said support in circuit with said heating element and a source of electrical energy, a heat responsive element located within said combustion chamber and arranged to be independently influenced by the heating element and heat generated within said combustion chamber by the burning refuse therein and a control shaft extending through said tubular support with one end connected to said heat responsive element and the other end operatively connected to said electric switch, said head responsive element comprising a bi-metallic member having one end affixed to the housing and its other end operatively connected to said control shaft.

JOHN W. HEBERT.

REFERENCES CITED

The following references are of record in the file of this patent:

UNITED STATES PATENTS

| Number | Name | Date |
|---|---|---|
| 1,093,592 | Rice | Apr. 14, 1914 |
| 1,599,912 | Naujoks | Sept. 14, 1926 |
| 1,643,206 | Epstein | Sept. 20, 1927 |
| 1,921,790 | Sword | Aug. 8, 1933 |
| 1,986,886 | Freas | Jan. 8, 1935 |
| 2,010,460 | McKinley | Aug. 6, 1935 |
| 2,139,786 | Wiegand | Dec. 13, 1938 |